(12) United States Patent
Hodjat et al.

(10) Patent No.: US 8,246,872 B2
(45) Date of Patent: Aug. 21, 2012

(54) METHOD FOR MAKING COMPOSITE ARTICLE WITH EXPANDABLE ELASTOMER IN COMPRESSION

(75) Inventors: Yahya Hodjat, Oxford, MI (US); Yuding Feng, Rochester Hills, MI (US); Kathy Lambrinos, London (CA)

(73) Assignee: The Gates Corporation, Denver, CO (US)

( * ) Notice: Subject to any disclaimer, the term of this patent is extended or adjusted under 35 U.S.C. 154(b) by 143 days.

(21) Appl. No.: 12/340,864

(22) Filed: Dec. 22, 2008

(65) Prior Publication Data
US 2010/0159225 A1    Jun. 24, 2010

(51) Int. Cl.
*B29C 65/00* (2006.01)
(52) U.S. Cl. .................................................. 264/46.5
(58) Field of Classification Search ............... 264/46.5
See application file for complete search history.

(56) References Cited

U.S. PATENT DOCUMENTS

| | | | |
|---|---|---|---|
| 2,271,498 A | | 1/1942 | Overstreet |
| 2,409,759 A | | 10/1946 | Hosking |
| 3,185,266 A | | 5/1965 | Hofmeister |
| 3,255,128 A | | 6/1966 | Farkas et al. |
| 3,855,378 A | * | 12/1974 | Topcik ........................ 264/54 |
| 4,769,166 A | | 9/1988 | Harrison |
| 5,245,973 A | | 9/1993 | Otsuka et al. |
| 5,246,973 A | | 9/1993 | Nakamura et al. |
| 5,417,898 A | | 5/1995 | Volpi et al. |
| 5,852,854 A | | 12/1998 | Pierrot et al. |
| 6,026,709 A | | 2/2000 | Depp et al. |
| 6,077,135 A | | 6/2000 | Ito |
| 7,498,381 B1 | | 3/2009 | De Puydt et al. |
| 2002/0162627 A1 | | 11/2002 | Dunlap |
| 2006/0142403 A1 | | 6/2006 | Sugiura et al. |
| 2006/0173115 A1 | | 8/2006 | Fudemoto et al. |
| 2008/0029919 A1 | | 2/2008 | Howe et al. |

(Continued)

FOREIGN PATENT DOCUMENTS

EP    1 467 014 A1    10/2004

(Continued)

OTHER PUBLICATIONS

Notification of Transmittal of the International Search Report and Written Opinion of the International Searching Authority PCT/US2009/006597, Mailed Dec. 6, 2010.

(Continued)

*Primary Examiner* — Larry Thrower
(74) *Attorney, Agent, or Firm* — P. N. Dunlap, Esq.; J. A. Thurnau, Esq.; T. A. Dougherty, Esq.

(57) ABSTRACT

A method of making a composite article includes providing an elastomeric composition with a blowing agent having an activation temperature and providing at least one structural member defining a fixed gap. The composition is formed below the blowing agent's activation temperature into a solid elastomeric member approximately the thickness of or larger than the gap. The elastomeric member is assembled into the gap, which may place the elastomeric member in a state of compression in the gap. The elastomeric member is then expanded by heating it above the activation temperature. During expansion, the escape of the gas produced is limited to increase the state of compression of the elastomer in the gap by means of confining any free surfaces or by including a platy filler such as nanoclay in the composition.

18 Claims, 2 Drawing Sheets

U.S. PATENT DOCUMENTS

2008/0075864 A1    3/2008   Billotto et al.
2009/0076203 A1*   3/2009   de Puydt et al. .............. 524/237

FOREIGN PATENT DOCUMENTS

| | | |
|---|---|---|
| EP | 1921121 A1 | 5/2008 |
| GB | 720549 | 12/1954 |
| GB | 737485 | 9/1955 |
| GB | 829912 | 3/1960 |
| GB | 1115573 | 5/1968 |

OTHER PUBLICATIONS

Southern Clay Products, Inc., Cloisite and Nanofil Additives, Web page, 2006 Rockwood Specialities, Inc., 7 pages.

Nanocor, Inc., Nanomer Products for Polyolefin Nanocomposites, Article, 2 pages.

Peter Maul, Nanocor, Inc., Barrier enhancement Using Additives, Article, Dec. 5, 2005, 11 pages.

* cited by examiner

METHOD FOR MAKING COMPOSITE ARTICLE WITH EXPANDABLE ELASTOMER IN COMPRESSION

BACKGROUND OF THE INVENTION

1. Field of the Invention

This invention relates generally to a method of making an elastomer-metal composite article having an elastomeric member in compression, more particularly to an elastomer-metal bonded article with an expanded cellular elastomeric member comprising a platy filler in compression between two rigid surfaces.

2. Description of the Prior Art

Articles combining rubber or elastomeric members with metal or other rigid, structural members find many uses. Of particular interest are articles subject to dynamic or repeated stresses. Examples include various vibration control devices, such as vibration isolating mounts for vibrating equipment, vibration dampers, isolators, couplers, shock absorbers, and the like. In general, the rubber member provides a vibration damping or isolating function and the structural member provides a means for attaching the rubber or the article to other equipment, such as to the source of the vibration, or to a stationary location or support, and/or to freely vibrating masses. The elastomeric member may hold together two or more structural members and function as a connecting spring or have a structural role. Herein, "structural member" will not refer to the elastomeric member. Structural members are typically of metal but could be of other relatively rigid materials. Herein, such rubber-metal parts will be referred to generally as composite articles. It should be understood that composite articles may encompass any combination of one or more elastomeric or rubber members and one or more rigid, structural members of metal, structural composite, or other relatively rigid material.

In composite articles subject to dynamic stresses, it is known that maintaining a degree of compressive stress sufficient to prevent tensile deformation of the rubber is beneficial for extending the fatigue life of the rubber member. If the rubber is subject to repeated tensile deformation, then cracks will have a tendency to grow more rapidly. If the rubber is first subject to compression, such crack growth tendencies can be minimized. By compressive stress or load is meant a stress or force tending to reduce a linear dimension of a rubber member. Compression or a state of compression may be characterized by the deflection or linear deformation exhibited under a compressive stress or load. ASTM D395 or D575 provides a useful way to characterize compression based on the percent change in a linear dimension, i.e. a compressive deformation or deflection. Likewise, tension or elongation may be characterized by an increase in linear dimension of a rubber member under a tensile force or stress as defined in ASTM D1566.

One way to form a composite article with a rubber member in compression is to forcefully insert or press fit a cured or vulcanized rubber member into a rigidly defined gap between two rigid members that is smaller than the thickness of the rubber member. If it is desired to adhesively bond vulcanized rubber and metal members together, one or both of the surfaces of rubber and/or metal may be treated with an appropriate adhesive which may be activated by heat after assembly. Generally, a state of compression in the rubber member may be maintained by this so-called "post-vulcanization bonding" process. However, multiple steps are required, including first forming and vulcanizing the rubber member, then cleaning the rigid member, applying adhesive, then assembling the rubber and rigid members, and finally curing the adhesive. Moreover, compression set or relaxation effects are detrimental to the state of compression.

On the other hand, if adhesion is obtained by vulcanizing the rubber member in place against the metal surfaces, a so-called "vulcanization bonding" process, thermal shrinkage after cooling after vulcanization is likely to remove any compression created during assembly and put the rubber member into a state of tension. While post-vulcanization bonding is generally superior for maintaining rubber members in compression, vulcanization bonding may generally produce more robust adhesion between rubber and metal. Vulcanization bonding can also be accomplished with fewer process steps than post-vulcanization bonding, including for example the elimination of the separate adhesive, but the inability to maintain the rubber member in compression can severely limit the durability of the assembled part in use.

U.S. Pat. No. 7,291,241 describes a two-step cure method whereby a partially cured rubber member may be assembled under compression and then bonded in the absence of a separate adhesive. By controlling the degree of partial cure in the first step, the amount of compression retained in the final part can be significant. However, the degree of compression attainable or retained may still not be sufficient to assure long life under dynamic load conditions, and the cure state may be difficult to control consistently. Compression set and/or relaxation effects may reduce or eliminate any degree of compression achieved initially. Improved or alternate methods of forming a rubber-metal or other elastomeric composite part having an elastomer under compression may be desirable, especially for dynamic applications.

Various articles and processes have been suggested utilizing foam or cellular rubber instead of solid rubber. U.S. Pat. No. 6,077,135 suggests using "rubber, foam, epoxy, or some other flexible material" compressed and/or bonded between a torsional damper's outer hub and ring. U.S. Pat. No. 6,026,709 suggests using a compressible material, if necessary, of porous plastic material, a foam material, or rubber sponge in a crankshaft damper as a torsional elastic coupling element. Why compressibility (presumably volumetric or bulk compressibility) would be necessary is not mentioned, but may be to make the coupling or rubber spring so flexible that the first fundamental frequency is very low. In general, rubber sponge is much softer than the solid material equivalent, and the cells are "open" or inter-connected.

U.S. Pat. No. 2,271,498 describes a conventional process for making closed-cell cellular rubber wherein the rubber is heated and partially vulcanized in a closed mold to a point at which gas is generated, then releasing the rubber from the confining mold to permit expand up to three to five times the original volume to fill a second larger mold cavity where complete vulcanization also occurs. U.S. Pat. No. 3,855,378 describes a process for preparing closed-cell expanded rubber in which vulcanizable rubber with a blowing agent is partially cured at a temperature lower than that at which substantial decomposition of the blowing agent occurs and subsequently expanding and completing the cure of the partially cured rubber. The examples therein indicate that significant blowing occurs upon partially curing, with linear expansions of about 12 to 75%. After blowing and final curing, the rubber has expanded about eight-fold in volume. Pat. No. GB 1,115,573 suggests no blowing takes place during vulcanization when using a high temperature blowing agent with activation temperature at least 20° C. above the vulcanization temperature. The final cellular articles are expanded about 100% in at least one direction, or about eight-fold in volume. Pat. No. GB 829,912 adapts the blowing process to run continuously for making expanded rubber extrusions. Pat. No. GB 737,485 utilizes an expandable mold so that partial vulcanization and expansion in one direction with secondary vulcanization can be carried out without transferring the material between two molds. Pat. No. GB 720,549 discloses a process for bonding sponge or cellular rubber to a metal insert or object using an adhesive and/or unvulcanized rubber film layer on the metal surface, followed by conventional expanding and vulcanization bonding in a suitable mold.

SUMMARY

The present invention is directed to systems and methods which provide a composite article having an elastomeric member residing in a state of compression between rigid members.

The present invention is directed to a method of making a composite article. The method includes providing an elastomeric composition with a blowing agent having an activation temperature and providing at least one structural member defining a fixed gap. The composition is formed at a temperature below the blowing agent's activation temperature into a solid elastomeric member with a dimension approximately the same as or larger than the gap. The elastomeric member is assembled into the gap with said dimension aligned with said gap, which may place the elastomeric member in a state of compression in the gap. The elastomeric member is then expanded by subjecting it to a temperature at or above the activation temperature. During the expansion of the elastomeric member, the escape of gas produced by the blowing agent must be limited in order to realize an advantageous increase in the state of compression of the elastomeric member in the gap.

In one embodiment, the gas escape is limited by placing a barrier surface, such as a metal plate, near or against one or each free surface of the assembled elastomeric member. In another embodiment the gas escape is limited by the presence of a platy filler in the composition. The platy filler may be nanoclay, mica, flake graphite, glass flake, or the like, to increase the diffusion distance and thus reduce escape of gas from the expanding composition. As a result of gas pressure within many small bubbles in the elastomer, the force or pressure exerted by the elastomeric member against the structural member may be advantageously increased.

According to an embodiment of the invention, the elastomeric member may be bonded to one or both structural members. The structural member may be coated with a suitable adhesive, or the composition may include an adhesive ingredient for direct bonding to the structural member. In either case, the bonding may occur during the forming step or during the expansion step.

In other embodiments, the composition may include a vulcanizing agent, and the forming step may include at least partially curing or vulcanizing the composition. The partial cure may be from 5% to 99%, or from 20% to 80%, or from 45% to 65% of complete cure.

In various embodiments of the invention, the method may result in an expanded elastomeric member having a plurality of closed cells having a diameter of up to about 20 microns, and the cells may occupy an area fraction of a sample cross-section of the elastomeric member in the range of up to about 50%, or from 2% to about 50%, preferably from about 3% to about 30%, or from 5% to 20%. Alternately or in addition, the expansion of the elastomeric member may be characterized by a thickness increase or linear expansion of up to about 25%, or from about 1% to 25%, preferably from 2% to 15%, or from 3% to 10%. Alternately or in addition, the expansion of the elastomeric member may be characterized by a volumetric expansion of up to about 75% or from 3% to 75%, preferably from 6% to 45%, or from 9% to 30%.

The invention is also directed to a composite article having an elastomeric member residing in a state of compression in a fixed gap defined by two structural members. The elastomeric member has a plurality of gaseous cells of average diameter up to about 20 microns or from about 3 microns to 15 microns. The gaseous cells may make up to 95%, or from 1% to 35%, or from 9% to 30% of the volume of the expanded elastomeric member, corresponding approximately to 3% to 10%, or up to 25% linear expansion. The elastomeric member may be bonded to one or both structural members, and the bonding may be with an adhesive coating, or preferably, without an adhesive layer due to the presence of an adhesive ingredient in the elastomeric member. The elastomeric member may also include a platy filler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figures 1A, 1B, 1C, 1D:
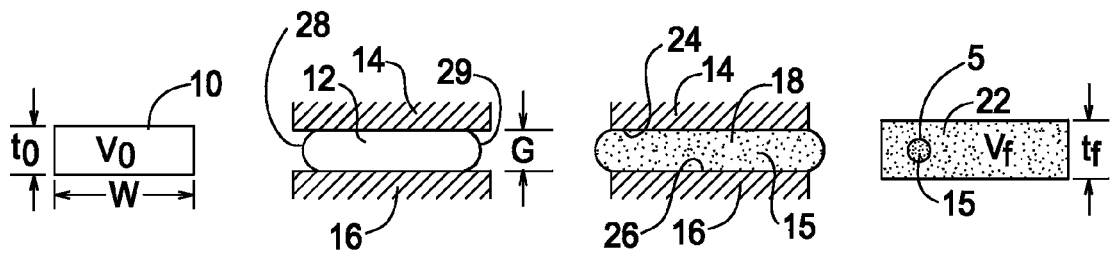
FIG. 1 is a diagram illustrating steps of a method according to an embodiment of the invention.

The present invention is directed to a method of making a composite article, aspects of which are illustrated in the diagrams of FIG. 1. The method includes providing an elastomeric composition with a blowing agent having an activation temperature. The composition is formed at a temperature below the blowing agent's activation temperature into an elastomeric member which is substantially solid. By "solid" is meant there are substantially no voids or gaseous bubbles in the elastomer. It is understood that there could always be small amounts of voids or bubbles as defects in the elastomer. In FIG. 1a, elastomeric member 10 has thickness $t_0$, width w, and volume $V_0$. The method includes providing at least one structural member defining a fixed gap. In FIG. 1b, upper structural member 14 and lower structural member 16 define a fixed gap of separation distance G.

The thickness $t_0$ of elastomeric member 10 approximately the same as or larger than gap distance G. The elastomeric member is assembled into the gap with said dimension aligned with said gap, which results in elastomeric member 12 in a state of compression in the gap. The state of compression is preferably defined as the percent deflection in the thickness direction and calculated as $(1-G/t_0)$. Compressing the thickness of member 12 results in an increased width and may cause the edges 28 and 29 to bulge. It may be advantageous at this stage for the width of elastomeric member 12 to be less than the width of structural members 14 and 16 as illustrated in FIG. 1b in order to allow room to expand. The elastomeric member is then expanded by subjecting it to a temperature at or above the activation temperature. As shown in FIG. 1c, expanded elastomeric element 18 now substantially fills the space between structural members 14 and 16, most of the expansion occurring in the width direction, because gap G is fixed or immovable. The many small gas bubbles 15 exert pressure in all directions. The pressure exerted between elastomeric member 18 and structural members 14 and 16 at surfaces 24 and 26 is particularly advantageous for effectively increasing the state of compression of elastomeric member 18 and improving its resistance to crack growth, flex fatigue, or the like. FIG. 1d illustrates how the elastomeric member may appear if subsequently removed from the gap. Expanded elastomeric member 18 after removal becomes relaxed elastomeric member 22 which now has relaxed thickness $t_f$ and relaxed volume $V_f$. The ratio $t_f/G$ gives an indication of the amount of linear "spring-back" and provides an indication of the amount of pressure exerted by the compressed and/or expanded elastomeric element on the structural elements. The percent linear spring-back may be indicated by the quantity $(t_f/G-1)$. Likewise, the volumetric spring-back ratio $V_f/V_0$ or the percent volumetric expansion $(V_f/V_0-1)$ may be useful measures to characterize the amount of expansion and/or the state of compression of the expanded elastomeric element.

It should be understood that the ratios and measures described above for characterizing the expansion and/or spring-back of the elastomeric element may include or be confounded with other effects such as creep, relaxation, compression set, or the like. Nevertheless, they provide a practical indication of the advantageous effects of the invention. For example, torsional vibration dampers made according to the two-step cure method disclosed in U.S. Pat. No. 7,291,241 might typically exhibit linear spring-back of about 10%. Similar dampers made according to the present inventive method have exhibited linear spring-back of up to 20% or 30% or more.

Figure 5:
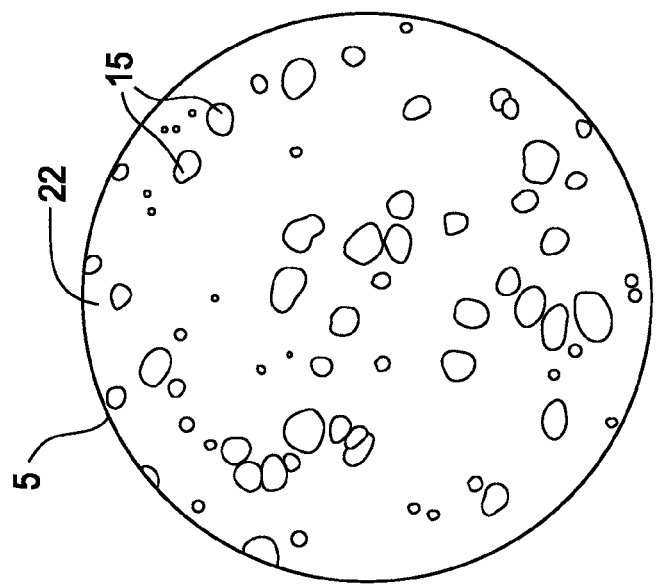
FIG. 5 is an enlarged diagram illustrating an aspect of an elastomeric member according to an embodiment of the invention.

FIG. 5 illustrates region 5 of the expanded and relaxed elastomeric member 22 as viewed at about 300× magnification. Gas bubbles 15 more or less uniformly occupy the viewed cross section of expanded elastomeric member 22. According to an embodiment of the invention, the gas bubbles may be spherical or deformed to various non-spherical shapes having some characteristic dimension or average diameter of up to about 20 microns. Larger bubbles are believed to be undesirable because they may function as crack initiation sites. The amount or concentration of bubbles should not be too high for use in dynamic applications because of the resulting decrease in tensile strength, elongation, tear strength and the like. The amount of bubbles may be conveniently indicated by measuring the area of the bubbles in a sample cross section such as FIG. 5 and calculating the ratio of the total bubble area, $A_b$, to the total sample area, $A_0$. The percent bubble area also indicates the percent expansion of the elastomeric element on an area basis. An area expansion ratio may be calculated as $(1+A_b/A_0)$, and this area expansion ratio correlates with the square of the linear expansion ratio discussed above. Likewise, the volumetric expansion ratio correlates with the cube of the linear expansion ratio and/or the area expansion ratio to the 3/2 power. Any of the expansion ratios described can be converted to a percent expansion by subtracting one and multiplying by 100 percent. In various embodiments of the invention, any one or more of the expansion ratios or percents may be used to characterize the elastomer.

In various embodiments of the invention, the method may result in an expanded elastomeric member having a plurality of closed cells. The closed cells need not be perfectly spherical, and may be deformed from the nature of the expansion process or from subsequent handling of the elastomeric element. The cells or bubbles may be characterized by an average dimension such as an average diameter, which may be referred to herein as simply a diameter. Thus, the closed cells may have a diameter of up to about 20 microns or from about 3 microns to about 15 microns, and the cells may occupy an area fraction of a sample cross-section of the elastomeric member in the range of up to about 50%, or from 2% to about 50%, preferably from about 3% to about 30%, or from 5% to 20%. In various embodiments of the invention, the expansion of the elastomeric member may be characterized by a thickness increase or linear expansion of up to about 25%, or from about 1% to 25%, preferably from 2% to 15%, or from 3% to 10%. Alternately or in addition, the expansion of the elastomeric member may be characterized by a volumetric expansion of up to about 95% or from 3% to 75%, preferably from 6% to 45%, or from 9% to 30%.

During the expansion of the elastomeric member, the escape of gas produced by the blowing agent may need to be limited or prevented in order to realize an advantageous increase in the state of compression of the elastomeric member in the gap. Otherwise, the gas may diffuse out or blow out of the elastomer, creating an open-cell structure with no significant compressive force, or creating a distorted elastomeric member with most expansion occurring outside the gap or beyond the edges of the gap, or creating a closed-cell structure with no significant gas pressure to improve the compressive force or state of the elastomeric element. In one embodiment of the invention, at least one of the free surfaces of the elastomeric element, 28 or 29 in FIG. 1b for example, are confined by a barrier surface during the expansion step to limit the amount of expansion or to maintain some level of pressure on the expanding elastomer. The barrier surface may be placed near the free surface to allow a predetermined amount of expansion, or may be placed against the free surface with a predetermined force in order to generate a certain amount of gas pressure in the cells during blowing.

In another embodiment, gas diffusion may be limited by including a platy filler in the composition. Platy fillers have a relatively small thickness and a much larger planar surface area. Platy particles may be referred to as plates, platelets, flakes, or the like. Examples of suitable platy fillers are nanoclay, mica, flake graphite, glass flake, and the like, or combinations thereof. Platy minerals may have layers of plates or flakes which are preferably expanded or separated or exfoliated to provide microscopic barriers to gas diffusion. The platy filler creates a tortuous diffusion path for gas molecules, limiting or preventing the loss of gas pressure from the bubbles during and/or after the expansion or blowing process. A preferred platy filler is nanoclay. Nonlimiting examples of suitable nanoclays include the organically modified, nanometer scale, layered magnesium aluminum silicate platelets sold under the CLOISITE and NANOFIL trademarks by Southern Clay Products, Inc., and nanoclays sold under the NANOMER trademark by Nanocor, Inc. A suitable nanoclay is montmorillonite which may be suitably modified with a quaternary ammonium salt, a primary amine, a silane, or the like. The amount of platy filler to use depends on various parameters of the filler, such as the size, aspect ratio, and the like, as well as the nature of the elastomer composition including its permeability, modulus, and the like. Addition of platy filler may affect the physical properties of the composition, so adjustment of other ingredients may be necessary, according to compounding methods known in the art. In an embodiment of the invention, the platy filler may include platelets ranging from 1 to 500 microns in size, or from about 2 to about 20 microns, or the average platelet size may be in the range from about 5 to about 50 microns.

Figure 2:
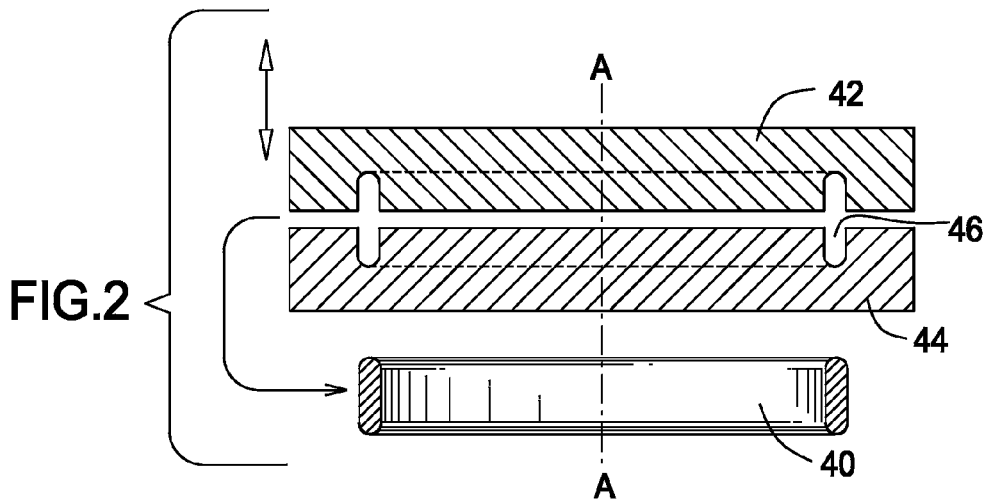
FIG. 2 is a sectional diagram of a mold and an elastomeric member according embodiment of the invention.

FIG. 2 illustrates a forming step according to an embodiment of the invention, whereby a suitable elastomer composition is formed into a desired shape for an elastomeric element for a composite article. In FIG. 2 mold upper half 42 and mold lower half 44 define a mold cavity 46 capable of producing elastomeric element 40 in the shape of a cylindrical annular ring, all with symmetry axis A-A. The composition may be injection, transfer, or compression molded. Alternately, the composition may be extruded and/or cut to size. The composition has a blowing agent having an activation temperature, but is molded or formed at a temperature lower than the activation temperature so that the resulting elastomeric element 40 is substantially solid or dense, not significantly expanded or cellular.

Figure 3:
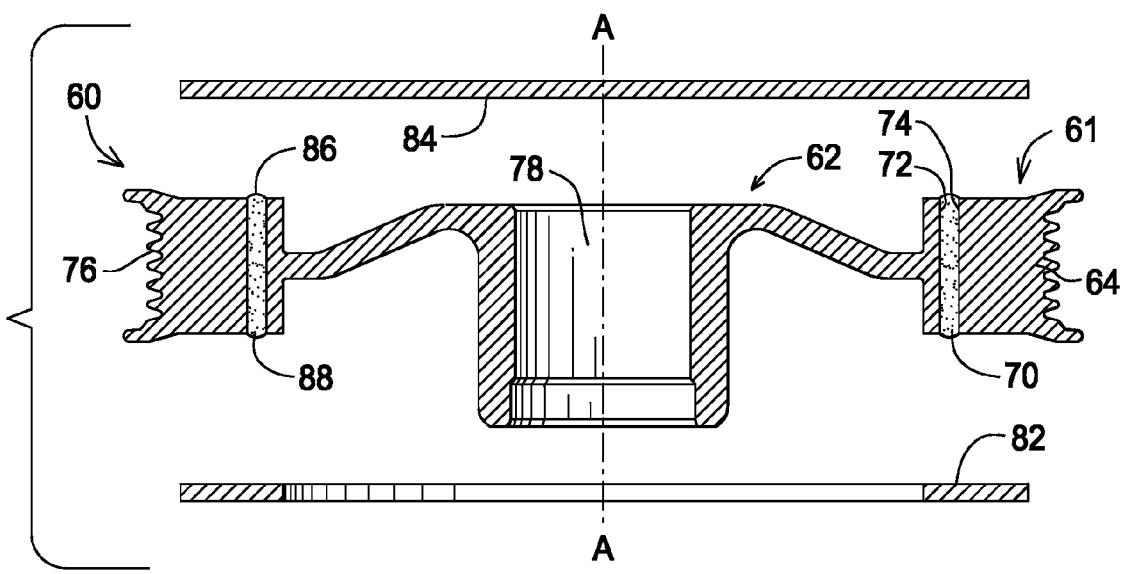
FIG. 3 is a sectional diagram of a composite article and an aspect of a method according to embodiments of the invention.

FIG. 3 shows torsional vibration damper 60 as an example of a composite article embodiment made according to an embodiment of the inventive method. Damper 60 could also be representative of a vibration isolator. Damper 60 is in the form of a dual ring damper with outer ring 61 and inner hub 62 having inner and outer cylindrical surfaces 74 and 72, respectively, defining there between an annular gap in which expanded elastomeric member 70 resides in a state of compression. Note that the metal ring 61 and hub 62 may move relative to each other only until joined together by the annular elastomeric ring 70, nevertheless the gap is "fixed" or immovable in the sense used herein after insertion of the elastomeric ring. The characteristic feature of a fixed gap is that it can hold an elastomeric element in a state of compression in the absence of any external force. Outer ring 64 may include a substantial mass 64 which is involved in the vibration damping function as known in the art. Outer ring 64 may also have profile 76 for use as a pulley in a belt drive system. Profile 76 is adapted for a multi-ribbed V-belt, but may instead be adapted for a V-belt, toothed belt, flat belt, or any other desired profile. Hub 62 is also adapted for mounting on a drive shaft at opening 78. Damper 60 has symmetry axis A-A.

Damper 60 may be assembled by forcing ring-shaped elastomeric element 40 into the annular gap, with a suitable lubricant if necessary. The assembly may then be heated to activate the blowing agent, thereby expanding the elastomeric element to form expanded elastomeric element 70. During the expansion process, according to one embodiment, the assembly may be confined between one or both barrier plates 82 and 84 to limit the expansion of the edges 86 and/or 88 and thereby assist the development of pressurized, closed cells or gas bubbles within element 70 and limit the escape of the gas or gases during expansion. Thus, the state of compression in the elastomer element can be enhanced, and the elastomeric spring force between the interfaces 72 and 74 increased.

Figure 4:
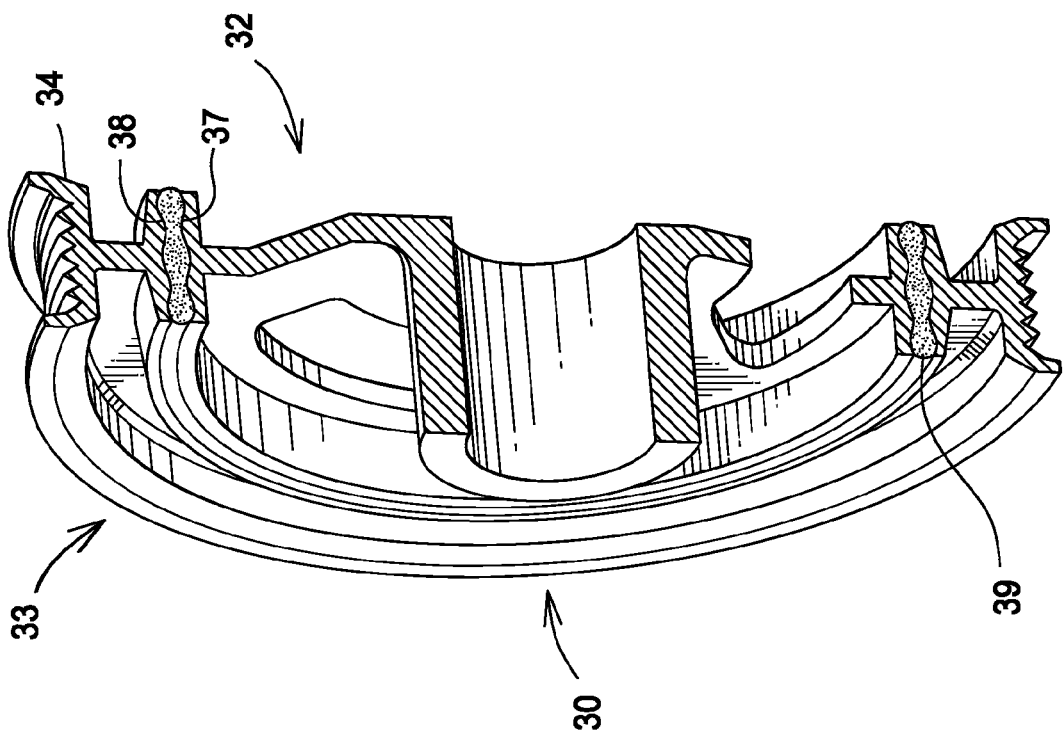
FIG. 4 is partially fragmented perspective view of a composite article according to an embodiment of the invention.

FIG. 4 shows a perspective fragmented view of another composite article embodiment of the invention. Dual ring damper 30 has hub 32 and pulley 33. However, pulley 33 has an I-beam shape with outer rim 34 having a belt profile and inner cylindrical surface 38 which has a wavy configuration. Likewise, hub 33 has outer wavy surface 37. Expanded elastomeric element 39 resides in the gap between surfaces 37 and 38 in a state of compression as described above in connection with FIG. 3. Thus, a fixed gap need not be of uniform thickness, or any particular shape, as long as it is capable of maintaining a state of compression on an inserted elastomeric member in the absence of external forces. In certain embodiments of the invention, it may be advantageous to adapt one or both structural members with a profiled or indented surface, such as the wavy surfaces shown in FIG. 4, or with splines, grooves, holes, scratches, or any other indentation that could result in mechanical locking of the elastomer. Then an elastomeric member can be lightly pressed into the gap and expanded to fill the profile or indentations in the structural member, resulting in mechanical locking instead of or in addition to adhesive bonding. Filling in such shapes with elastomers using conventional processes of forcing the elastomer in is either very difficult or impossible.

The elastomeric composition of the invention may be a thermoplastic elastomer or thermoset elastomer or rubber. Exemplary thermoset or vulcanizable or curable elastomers include ethylene-alpha-olefin elastomers such as EPM or EPDM, SBR, NR, NBR, HNBR, HSBR, BR, CR, IR, ACM, AEM, and the like as defined in ASTM D1418. Two or more elastomers may be blended. The composition may include various known compounding ingredients such as carbon black and non-black fillers, reinforcing or extending fillers, plasticizers, extending oils, antidegradants, stabilizers, colorants, processing aids, coagents and vulcanizing agents and the like.

According to an embodiment of the invention, the elastomeric member may be bonded to one or both structural members. The structural member may be coated with a suitable adhesive or multi-layer adhesive system, or the composition may include an adhesive ingredient or combination of ingredients for direct bonding to the structural member. In either case, the bonding may occur during the forming step or during the expansion step or both. Exemplary compositions based on exemplary adhesive ingredients for direct bonding to metal are described in U.S. Pat. No. 7,291,241, the contents of which are hereby incorporated herein by reference. As nonlimiting examples, adhesive ingredients may include metallic salts of carboxylic acid esters such as zinc diacrylate or zinc dimethacrylate, maleated polymers such as polybutadienes, various silanes, imides, tackifiers, or the like.

In other embodiments, the composition may include a vulcanizing agent, also referred to as a curative or cure system, and the forming step may include at least partially curing or vulcanizing the composition. For example, the cure system may be based one or more of sulfur, accelerators, amines, metal oxide, peroxide, radiation, or the like. The partial cure may be from 5% to 99%, or from 20% to 80%, or from 45% to 65% of complete cure. The degree of partial cure may be determined by any convenient method, such as according to ASTM D5289 using a moving die rheometer or rotorless cure meter to simulate the cure cycle, or by direct measurement of a property such as a physical property, a dielectric property, a chemical property such as residual curative amount, or a thermal property such as a reaction exotherm, or the like. Exemplary vulcanizing agents are disclosed in U.S. Pat. No. 7,291,241, the contents of which are incorporated herein by reference.

The blowing agent used in the invention can be one or more of many available types, such as organic, inorganic or chemical blowing agents. The blowing agents may be used alone or in combination with one or more other blowing agents. A blowing agent may be selected to have an activation temperature well above the processing and/or cure temperature of the elastomeric member. Thus, the elastomer may be formed and inserted into the structural members before significant expansion occurs. The expansion may then be activated in a controlled manner by raising the temperature of the elastomeric member and the assembly.

Exemplary inorganic blowing agents include carbon dioxide, nitrogen, argon, air, sulfur hexafluoride, and helium. Exemplary organic blowing agents include gaseous aliphatic hydrocarbons having 1-4 carbon atoms and fully and partially halogenated aliphatic hydrocarbons having 1-4 carbon atoms. Aliphatic hydrocarbons include methane, ethane, propane, n-butane, isobutane, and the like. Fully and partially halogenated aliphatic hydrocarbons include fluorocarbons, chlorocarbons, and chlorofluorocarbons. Examples of fluorocarbon blowing agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbon and chlorofluorocarbon blowing agents include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,2-dichlorotetrafluoroethane (CFC-114), chloroheptafluoropropane, and dichlorohexafluoropropane.

Exemplary chemical blowing agents include azodicarbonamide ("ADC"), modified ADC, salts and esters of azodicarboxylic acid such as barium azodicarboxylate, p-toluenesulfonylsemicarbazide ("TSS"), azobis(isobutyronitrile), N,N'-dimethyl-N,N'-dinitrosoterephthalamide, benzenesulfonylhydrazide, 4,4'-oxybis(benzolsulfonylhydrazide), diazoaminobenzene, 5-phenyltetrazole, trihydrazinotriazine, and mixtures of citric acid and sodium bicarbonate, such as the various products available from Clariant Corporation under the trademark HYDROCEROL, or the various products believed to be available from Lion Copolymer, LLC or the former Crompton Corporation under the trademarks CELOGEN, ACTICELL, EXPANDEX, and OPEX. Chemical blowing agents are preferred. ADC, modified ADC, and TSS are preferred chemical blowing agents. The gaseous cells formed by chemical blowing agents are filled with the gaseous byproducts of decomposition of the agent.

The invention is directed to the method described above and is also directed to a composite article having a cellular elastomeric member residing in a state of compression in a fixed gap defined by two structural members, as made by the inventive method.

To demonstrate embodiments of the invention, a number of example compositions were mixed, formed, and expanded. The examples were all based on EPDM elastomer with carbon black filler and peroxide curatives. The mixing was done according to conventional practice for rubber materials, i.e., using an internal mixer of the Banbury type. The compounds were mixed in two stages, with peroxide curatives and blowing agents added in the second stage. In some examples, a composite article in the form of a crank damper similar to those shown in FIG. 3 or 4 was made according to an embodiment of the invention. To make a crank damper, the elastomeric composition was molded into a ring by injection molding for about 50 seconds at about 160° C., well below the activation temperature of the blowing agent, and enough to cure the composition about 50-80% of full cure. The ring was force fit into the damper gap. The gap of the dampers used was about 3.5 mm in spacing, and the molded elastomeric rings were about 5 mm thick. Thus, the elastomer was compressed about 30% upon insertion into the gap. The damper assembly was placed in an oven for 60 minutes at 190° C., activating the blowing agent, causing the elastomer to expand, curing the elastomer, and bonding the elastomer to the metal damper parts. Spring-back of the expanded elastomer was observed by cutting a thin section the damper. Although, this removed the compressive force on the elastomer, it should be recognized that the restrictive effect of bonding to the metal was still present. Some examples were free-blown and the percent linear expansion reported, i.e., the blowing agent was activated by heating the molded, partially cured ring in the absence of any compressive forces or confining mold so the elastomer could expand freely and fully cure. The torque-to-turn test ("TTT") was carried out on most of the damper examples by rotating the hub with the outer ring fixed until the elastomer element or the adhesion failed and recording the peak torque. For some examples, the TTT test was done after a durability test involving a period of time on a vibrating rotational shaker test. When reported, tensile tests followed ASTM D412 using dumbbells cut from the freely expanded, fully cured, elastomer rings. Compression set tests followed ASTM D395 Method B. Other aspects of the examples will be explained below.

Table 1 shows a first series of examples. Inventive examples are designated "Ex.", while comparative examples are designated "Comp. Ex." Comp. Ex. 1 illustrates a composition that did not expand noticeably when inserted into the damper and heated. Failure to expand is believed due to the elastomer matrix being too stiff, whether from degree of cure, too little blowing agent, or other compounding parameters. Comp. Ex. 2 illustrates a composition that expanded during blowing while inserted into the damper, but it exhibited no spring-back after removal from the damper. The expansion is believed to result from an increase in amount of blowing agent and decrease in filler levels compared to Comp. Ex. 1. The lack of spring-back in Comp. Ex. 2 is believed due to freedom to expand towards the edges of the gap without generating pressure against the rigid damper surfaces. Comp. Ex. 3 and 4 expanded too much in this lateral way, resulting in a lot of elastomer bulging out of the damper gap and no benefit. Finally, inventive Ex. 5 was heated to activate the blowing agent in the presence of two barrier plates applied to the free edges of the damper gap, as illustrated in the embodiment of FIG. 3. As a result, Ex. 5 exhibited good spring-back after the expanded elastomeric member was removed from the damper.

Table 2 shows two series of examples which demonstrate the use of nanoclay to limit the escape of gases during blowing in an embodiment of the invention, instead of the physical barrier used in the embodiment of Ex. 5. The first series in Table 2, Ex. 6 and 7 have the same composition as Ex. 5 except that 10 parts of nanoclay are substituted for 10 parts of the carbon black. The observed spring-back exhibited by Ex. 6 and 7 was remarkable. As mentioned above, the typical spring-back for a solid elastomer ring is about 10%, and the free-blown elastomers of Ex. 6 and 7 expanded about 21-22%. The spring-back of Ex. 6 and 7 of 30-31% is thus very close to the sum of the usual unexpanded spring-back plus the free blowing expansion, even though the blowing was carried out in a state of compression with the edges free to expand. Thus, the gas pressure must be providing additional forces resisting compression, which is desirable for improving the resistance to fatigue of a dynamically stressed elastomer component such as in a crank damper. In addition, the nanoclay must be maximizing the pressure build up in the cells or bubbles in order to produce those additional forces.

TABLE 1

|  | Comp. Ex. 1 | Comp. Ex. 2 | Comp. Ex. 3 | Comp. Ex. 4 | Ex. 5 |
|---|---|---|---|---|---|
| Royalene 4697[1] | 200 | 200 | 200 | 200 | 200 |
| N293 Carbon black | 50 | 30 | 30 | 30 | 30 |
| N550 Carbon black | 93 | 50 | 50 | 50 | 50 |

TABLE 1-continued

|  | Comp. Ex. 1 | Comp. Ex. 2 | Comp. Ex. 3 | Comp. Ex. 4 | Ex. 5 |
|---|---|---|---|---|---|
| Zinc Oxide | 5 | 5 | 5 | 5 | 5 |
| Zinc Stearate | 1.5 | 1.5 | 1.5 | 1.5 | 1.5 |
| Triethanolamine | 1 | 1 | 1 | 1 | 1 |
| Antioxidant[2] | 1.5 | 1.5 | 1.5 | 1.5 | 1.5 |
| Paraffinic Oil | 5.9 | 5.9 | 5.9 | 5.9 | 5.9 |
| Zinc dimethacrylate | 33 | 15 | 15 | 15 | 15 |
| HVA-2[3] | 1 | 1 | 1 | 1 | 1 |
| Varox 130XL[4] | 1 | 1 | 1 | 1 | 1 |
| Varox 231XL[5] | 5.4 | 5.4 | 5.4 | 5.4 | 5.4 |
| Celogen RA[6] | 4 | 5 | 10 | 20 | 5 |
| expansion in composite article | poor | good | too much | too much | good |
| confined edges | no | no | no | no | yes |
| spring-back | — | poor | — | — | good |

[1]EPDM with 100 parts paraffinic process oil, from Lion Copolymer, LLC.
[2]Polymerized 1,2-dihydro-2,2,4-trimethylquinoline.
[3]N,N' m-phenylenedimaleimide, from Sartomer Company.
[4]2,5-dimethyl-2,5-di-(t-butylperoxy)-3-hexyne, from R. T. Vanderbilt Co., Inc.
[5]1,1-di-(t-butylperoxy)-3,3,5-trimethylcyclohexane, from R. T. Vanderbilt Co., Inc.
[6]p-toluenesulfonylsemicarbazide, from Crompton Corporation.

The second series of examples of elastomeric composition useful in embodiments of the invention in Table 2 demonstrate how some of the elastomer and damper properties can vary with the amount of blowing agent. Examples 8-12 have increasing amounts of blowing agent according to embodiments of the invention. It is apparent that the gas pressure generated by blowing increases with increasing amount of blowing agent from the reported "blow pressure" measured on a specially equipped rotorless cure meter. The free expansion observed and the spring-back likewise increase with blowing agent level. The increase in free expansion and blow pressure is not linear, but appears to level off, suggesting diminishing returns beyond 10 phr (parts per hundred parts of elastomer resin) of this blowing agent.

TABLE 2

|  | Ex. 6 | Ex. 7 | Ex. 8 | Ex. 9 | Ex. 10 | Ex. 11 | Ex. 12 |
|---|---|---|---|---|---|---|---|
| Royalene 4697 EPDM | 200 | 200 | 200 | 200 | 200 | 200 | 200 |
| N293 Carbon black | 30 | 30 | 30 | 30 | 30 | 30 | 30 |
| N550 Carbon black | 40 | 40 | 40 | 40 | 40 | 40 | 40 |
| Cloisite 15A[1] | 10 | 0 | 0 | 0 | 0 | 0 | 0 |
| Nanomer I.44P[2] | 0 | 10 | 10 | 10 | 10 | 10 | 10 |
| Zinc Oxide | 5 | 5 | 5 | 5 | 5 | 5 | 5 |
| Zinc Stearate | 1.5 | 1.5 | 1.5 | 1.5 | 1.5 | 1.5 | 1.5 |
| Triethanolamine | 1 | 1 | 1 | 1 | 1 | 1 | 1 |
| Antioxidant | 1.5 | 1.5 | 1.5 | 1.5 | 1.5 | 1.5 | 1.5 |
| Paraffinic Oil | 5.9 | 5.9 | 5.9 | 5.9 | 5.9 | 5.9 | 5.9 |
| Zinc dimethacrylate | 33 | 15 | 15 | 15 | 15 | 15 | 15 |
| HVA-2 | 1 | 1 | 1 | 1 | 1 | 1 | 1 |
| Varox 130XL | 1 | 1 | 1 | 1 | 1 | 1 | 1 |
| Varox 231XL | 5.4 | 5.4 | 5.4 | 5.4 | 5.4 | 5.4 | 54 |
| Celogen RA | 5 | 5 | 1.5 | 3 | 5 | 7 | 10 |
| free expansion (linear %) | 21% | 22% | 5% | 10.5% | 19% | 22% | 25% |
| spring-back (%)[3] | 30% | 31% | 15% | 18% | 24% | 25% | 26% |
| TTT, original (N-m) | 2709 | 1900 | 2576 | 2169 | 1695 | 881 | 475 |
| Tensile strength (MPa) |  |  | 17.2 | 13.7 | 10.8 | 7.5 | 7.8 |
| Elongation at break (%) |  |  | 626 | 580 | 475 | 392 | 405 |
| Blow Pressure (MPa) |  |  | 3.0 | 3.4 | 3.7 | 3.9 | 4.1 |

[1]nanoclay from Southern Clay Products, Inc.
[2]nanoclay from Nanocor, Inc.
[3]In these examples, the free surfaces were not confined during the expansion of the elastomer in the crank damper.

The tensile strength, elongation, and hardness of the expanded elastomer decrease as more gas bubbles effectively dilute the rubber. Likewise, the TTT decreases as the amount of blowing agent and expansion increases, as these examples all exhibited rubber tear, not adhesion failure. Again, the decrease is not always linear, but appears to level off at higher levels of blowing agent. Thus, for a given application, for example with certain requirements for hardness, natural frequency, durability, torque capacity, and the like, the levels of blowing agent, nanoclay, and other compounding ingredients can be varied to provide a wide range of useful composite articles.

Based on examples of Table 2 and Table 3 to be discussed below, in various embodiments the amount of blowing agent in the elastomeric composition may advantageously be up to about 10 phr, or from about 1 to about 7 phr, or from 1 to 5 phr.

The examples of Table 1 and Table 2 are based on a rather soft rubber composition, which was thought might be relatively easy to expand. Table 3 illustrates embodiments of the invention based on a somewhat harder or stiffer rubber composition, along with a control composition. As can be seen from the data in Table 3, the free expansion of the stiffer formulation is considerably less at the same level of blowing agent as the examples in Table 2. Nevertheless, good spring-back was observed, indicating an advantageous increase in the state of compression of the elastomer in the damper. Moreover, TTT results both before and after durability testing indicated that the damper of Ex. 14, with 3 phr of blowing agent in the composition, exceeded the performance of the control, Comp. Ex. 12. The percent free expansion was calculated from a thickness measurement as in previous examples. In addition, sections of the expanded rubber were examined under optical microscope and scanning electron microscope at 200× or 400× ("SEM") to determine the bubble size and concentration. FIG. 5 illustrates a typical SEM observation. From such an observation the total bubble area was measured and percent area expansion calculated. From this the percent volume expansion was estimated as described above. The results of Table 2 and 3 suggest advantageous ranges of linear, area, and/or volumetric expansion as described above.

Comp. Ex. 13 exhibits a small amount of expansion, even in the absence of blowing agent, thus illustrating that a small amount of voids may be present in a so-called "solid" elastomer, or a substantially solid elastomer.

TABLE 3

| | Comp. Ex. 13 | Ex. 14 | Ex. 15 |
|---|---|---|---|
| Nordel MG 47130[1] | 110.5 | 110.5 | 110.5 |
| Nordel IP 4725P[2] | 15 | 15 | 15 |
| N293 Carbon black | 25 | 25 | 25 |
| N550 Carbon black | 45 | 45 | 45 |
| Nanomer 1.44P | 0 | 10 | 10 |
| Zinc Oxide | 5 | 5 | 5 |
| Zinc Stearate | 1.5 | 1.5 | 1.5 |
| Triethanolamine | 1 | 1 | 1 |
| Antioxidant | 1.5 | 1.5 | 1.5 |
| Paraffinic Oil | 55 | 55 | 55 |
| Zinc dimethacrylate | 33 | 33 | 33 |
| Ricon 154[3] | 0.2 | 0.2 | 0.2 |
| HVA-2 | 0.8 | 0.8 | 0.8 |
| Varox 130XL | 2 | 2 | 2 |
| Varox 231XL | 4.4 | 4.4 | 4.4 |
| Celogen RA | 0 | 3 | 5 |
| free expansion (linear %) | 0.5% | 3.7% | 6.5% |
| free expansion 200x | 0.2% | 6.7% | 17.5% |
| (SEM area percent) 400x | 0.45% | 8.8% | 19.1% |
| calculated expansion (vol %) | ~1% | 10-14% | 27-30% |
| TTT, original (N-m) | 4416 | 5187 | 3021 |
| TTT, after durability test (N-m) | 3790 | 4284 | 1126 |
| Tensile strength (MPa) | 12.3 | 11.9 | 9.2 |
| Elongation at break (%) | 371 | 345 | 303 |
| Hardness (Shore A) | 66 | 68 | 62 |
| Compression set (22 hrs/150° C.) | 36% | 53% | 74% |

[1]EPDM elastomer with 30 phr carbon black, from The Dow Chemical Company.
[2]EPDM elastomer, from The Dow Chemical Company.
[3]Polybutadiene resin, from Sartomer Company, Inc.

The invention is also directed to the composite articles produced by the method described herein. Embodiments of inventive articles have two rigid structural surfaces with an elastomeric element inserted in a fixed gap defined there between. The elastomeric element resides in a state of compression in the gap. The elastomeric element comprises a plurality of gaseous cells of average diameter up to about 20 microns and at a concentration of up to about 50% based on the area fraction of cells in a cross-sectional sample at suitable magnification. Alternately, other measures of cell concentration may be used and other ranges may be preferred, as described herein. For example, the gaseous cells may make up up to 95%, or from 1% to 35%, or from 9% to 30% of the volume of the expanded elastomeric member, corresponding approximately to 3% to 10%, or up to 25% linear expansion. The elastomeric member may be bonded to one or both structural members, and the bonding may be with an adhesive coating, or preferably, without an adhesive layer due to the presence of an adhesive ingredient in the elastomeric member. The elastomeric member may also include a platy filler. In preferred embodiments the platy filler may be one or more of nanoclay, flake graphite, mica, glass flake, or the like, preferably nanoclay. The composite article may be for example, a torsional or other vibration damper, a vibration isolator, a coupler, a bushing, a mount, or the like.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method comprising the following sequential steps:
  a) providing an elastomeric composition comprising a blowing agent having an activation temperature, and providing at least one structural member defining a fixed gap;
  b) forming said composition at a temperature below said activation temperature into a substantially solid elastomeric member with a dimension approximately the same as or larger than the gap;
  c) assembling said elastomeric member into said gap with said dimension aligned with said gap;
  d) expanding said composition by subjecting said assembled elastomeric member with said structural member to a temperature at or above said activation temperature; and
  e) limiting the escape of gas produced during said expanding;
  whereby a final composite article comprising said elastomeric member and said structural member is formed.

2. The method of claim 1 wherein said limiting comprises placing a barrier surface near a free surface of said assembled elastomeric member.

3. The method of claim 1 wherein said limiting comprises placing a barrier surface near each free surface of said assembled elastomeric member.

4. The method of claim 1 wherein said limiting comprises including a platy filler in said composition.

5. The method of claim 4 wherein said platy filler comprises one or more selected from the group consisting of nanoclay, graphite flake, glass flake, and mica.

6. The method of claim 4 wherein said platy filler comprises nanoclay.

7. The method of claim 1 wherein said composition further comprises a metal adhesive ingredient which bonds said elastomeric member to said structural member during at least one of said forming and said expanding without the use of an adhesive coating on said structural member.

8. The method of claim 1 wherein at least a portion of a surface of a structural member comprises an adhesive coating which bonds said elastomeric member to said structural member during at least one of said curing and said expanding.

9. The method of claim 1 wherein said composition further comprises a vulcanizing agent; and said forming includes at least partially curing said composition.

10. The method of claim 1 wherein said assembling places said elastomeric member in a state of compression in said gap.

11. The method of claim 1 wherein at least two structural members are provided and wherein said two structural members define said gap there between.

12. The method of claim 1 wherein said expanding results in an expanded elastomeric member comprising a plurality of closed cells having a characteristic diameter of up to about 20 microns, and wherein said cells occupy an area fraction of a sample cross-section of said elastomeric member in the range of up to about 50%.

13. The method of claim 1 wherein said expanding results in an expanded elastomeric member comprising a plurality of closed cells having a characteristic diameter of up to about 20 microns which expand the elastomeric member by up to about 25% in thickness based on the free-blown expansion of said substantially solid elastomeric member.

14. The method of claim 1 wherein said expanding results in an expanded elastomeric member comprising a plurality of closed cells having a characteristic diameter of up to about 20 microns which expand the elastomeric member by up to about 95% in volume based on the free-blown expansion of said substantially solid elastomeric member.

15. A method comprising the following sequential steps:
   a) providing an elastomeric composition comprising: a blowing agent having an activation temperature, a vulcanization agent such that said composition is vulcanizable below said activation temperature, and a platy filler, and providing at least two structural members defining a fixed gap there between;
   b) forming and at least partially vulcanizing said composition at a temperature below said activation temperature into a substantially solid elastomeric member with a dimension approximately the same as or larger than the gap;
   c) assembling said elastomeric member into said gap with said dimension aligned with said gap so that said elastomeric member resides in a state of compression in said gap;
   d) expanding said composition by subjecting said assembled elastomeric member with said structural members to a temperature at or above said activation temperature; and
   e) limiting the escape of gas produced during said expanding;

whereby a final composite article comprising said elastomeric member and said structural members is formed.

16. The method of claim 15 wherein said expanding results in an expanded elastomeric member comprising a plurality of closed cells having a characteristic diameter of up to about 20 microns, and wherein said cells occupy an area fraction of a sample cross-section of said elastomeric member in the range of up to about 50%.

17. The method of claim 16 wherein said platy filler comprises nanoclay.

18. The method of claim 17 wherein said composition further comprises a metal adhesive ingredient which bonds said elastomeric member to said structural member during at least one of said forming and said expanding without the use of an adhesive coating on said structural member.

* * * * *